(12) United States Patent
Meyer

(10) Patent No.: US 7,880,462 B2
(45) Date of Patent: Feb. 1, 2011

(54) PULSED COIL DRIVE CIRCUIT FOR A SAMPLED INDUCTIVE TRANSDUCER

(75) Inventor: Hans Ulrich Meyer, Morges (CH)

(73) Assignee: Advanced Sensor Technology Limited, Central (HK)

( * ) Notice: Subject to any disclaimer, the term of this patent is extended or adjusted under 35 U.S.C. 154(b) by 554 days.

(21) Appl. No.: 11/867,908

(22) Filed: Oct. 5, 2007

(65) Prior Publication Data

US 2008/0084203 A1    Apr. 10, 2008

Related U.S. Application Data

(60) Provisional application No. 60/828,221, filed on Oct. 5, 2006.

(51) Int. Cl.
    *G01B 7/14*    (2006.01)
(52) U.S. Cl. .............................. 324/207.17; 324/207.24
(58) Field of Classification Search ........................ None
    See application file for complete search history.

(56) References Cited

U.S. PATENT DOCUMENTS 4,334,179 A * 6/1982 Grimes et al. ............... 318/661
4,446,427 A * 5/1984 Lovrenich ............... 324/207.16
5,233,294 A * 8/1993 Dreoni .................. 324/207.16
5,270,646 A * 12/1993 Kihlberg et al. ......... 324/207.16
5,973,494 A * 10/1999 Masreliez et al. ....... 324/207.24
6,501,267 B1 * 12/2002 Kurokawa et al. .......... 324/242

* cited by examiner

*Primary Examiner*—Jay M Patidar
(74) *Attorney, Agent, or Firm*—Leydig, Voit & Mayer, Ltd.

(57) ABSTRACT

A pulsed coil drive for a sampled inductive transducer has at least one drive coil connected in a series circuit with a capacitor having a first terminal connected to the negative terminal of a voltage source. The series circuit is normally open during the intervals between pulses. Sampling occurs once per pulse. Each pulse's sampling interval is preceded by a pre-sampling interval and followed by a post-sampling interval. The supply voltage that is applied across the series circuit during both the pre- and post-sampling intervals is applied by switching a first terminal of the coil's free terminal to the voltage source's positive terminal through a p-channel MOSFET. During the sampling interval, the series circuit is shorted by switching the coil's free terminal to the voltage source's negative terminal through an n-channel MOSFET.

6 Claims, 3 Drawing Sheets

PULSED COIL DRIVE CIRCUIT FOR A SAMPLED INDUCTIVE TRANSDUCER

BACKGROUND OF THE INVENTION

This invention relates to a pulsed coil drive for a sampled inductive transducer. Such intermittently operated transducers are necessary in applications where a compromise has to be made between the inductive transducer's high frequency or bandwidth and the required low power consumption. They are currently used in battery powered small gauging tools like calipers, micrometers and dial indicators: with pulsewidths under 100 ns, their bandwidth is a few MHz. Their relatively low pulse or sampling rate (as sampling occurs once per pulse) in the order of ten thousand per second, limits their power consumption to a few hundred microwatt.

The pulses may be damped oscillations, generated by forming a resonant circuit with, a transducer's inductor and a capacitor and by periodically initiating an oscillation, as in U.S. Pat. No. 4,446,427 to Lovrenich. The first voltage peaks of the damped oscillation are sampled by peak detecting circuits, which do require current consuming operational amplifiers.

In U.S. Pat. No. 5,973,494 to Masreliez et al., the picked-up first resonant signal peak is detected by a simple sample-and-hold circuit, i.e. a sampling switch followed by a holding capacitor, needing almost no supply current. Another improvement is that magnetic energy may be recovered by stopping each damped sine-wave after one period at the occurrence of the second resonant voltage peak, at a peak voltage only slightly lower than the initially supplied voltage. The only energy required is thus in "topping up" from the peak voltage to the initially supplied voltage before starting another pulse.

However, the first voltage peak has to be sampled at the right time and the oscillation stopped right at the second voltage peak. As these instants are determined by the resonant circuit's inductance and capacitance, the timing has to be adjusted for every transducer type. If the timing is off by +/−50%, the sampled signal falls to zero, and if it is off by only +/−25%, there will be no energy recovery, as the oscillation stops at zero Volt instead of at a voltage peak. If generated by on-chip RC time constants, the timing may already change by as much as +/−20%, the variation range of both on-chip surface resistance per square and area capacitance being typically +/−10%. Besides adjusting for every transducer type, individual trimming might be needed if energy is to be recovered. Timing might be derived from the damped sine-wave itself, but this would need current consuming analog circuitry.

The simplest way around these timing constraints is to generate a non-resonant excitation signal which does not depend on the transducer's inductive load. Tf the same circuit also generates the sample and hold signals, the timing problem disappears. This is the case in U.S. Pat. No. 4,334,179 to Grimes et al., wherein a discontinuous rectangular pulse excitation can be applied to a resolver stator winding, while the outputs of the rotor windings are being sampled. The circuit, therefore, may remain quiescent a larger percentage of time, and power requirements are substantially reduced, even though the winding's magnetic energy is not recovered.

A magnetic energy recovering circuit, basically a buck converter without an external load, is disclosed in FIG. 5 of U.S. Pat. No. 5,233,294 to Dreoni, but only for a continuous square wave coil excitation. However it is known that buck converters can also recover energy in a pulsed or discontinuous mode, each isolated pulse applying first a positive voltage to the coil, then a negative one. Unfortunately, this mode would cause a net current through the inductor, which, in the absence of an external load would charge the capacitor in series with the inductor and impair the circuit's energy recovery.

Hypothetically, a buck converter wherein the load is a charge pump, with its input connected to the capacitor and its output connected to the supply rails, would remove the excess charge from the capacitor to restitute it to the supply. Energy recovery would thus be possible for a pulsed excitation, but at the added cost of a charge pump circuit, which itself requires at least one additional capacitor.

BRIEF SUMMARY OF THE INVENTION

Accordingly, it is an object of the invention to remedy to these shortcomings in that at least one coil and a capacitor form a series circuit open during intervals between pulses, each pulse having three successive intervals, a pre-sampling interval with a first voltage switched across the series circuit, a sampling interval with a second voltage switched across the series circuit long enough for adequate sampling, and a post-sampling interval with the first voltage switched across the series circuit.

The resulting pulse current ideally ramps from zero to a peak current during the pre-sampling interval, then ramps the other way and crosses zero to a second peak current equal but opposed to the first during the sampling interval, then ramps back to zero during the post-sampling interval. The corresponding magnetic energy builds up until the first current peak, then is restituted as electrical energy until the current crosses zero, builds up again until the second current peak and is restituted again as electrical energy until the current reaches zero. In reality there are some resistive losses, and some magnetic losses largely due to non-zero coil current at the end of a pulse. Still, the overall loss is much smaller than the un-recovered peak magnetic energy in the square pulse coil drives used in existing sampled transducers. The losses are also smaller than they would be in the hypothetical buck converter with a charge pump instead of a load, in which a positive voltage, then a negative one, is applied to the coil during each pulse: ramping up and down only once instead of twice in the same time doubles the peak current, which quadruples the resistive loss.

With higher losses, the current remaining at the end of the pulse increases. This current may advantageously be reduced either by making the post-sampling interval somewhat shorter than the pre-sampling interval, so as to have negligible current through the series circuit at the end of the pulse. This solution is best for transducers having always the same components. As an alternative, a freewheeling diode, shunting the switch applying the first voltage to the series circuit, which turns on when the voltage across the series circuit has the same polarity and is higher than the first voltage, may be used as a switch during the post-sampling interval. The diode turns on when the sampling interval ends and turns off when the current through the series circuit falls to zero, thereby ending the post-sampling interval: no magnetic energy is left at the end of the pulse, but at the cost of losses due to the diode's forward voltage.

A simple embodiment of a pulsed coil drive circuit according to the invention consists in that the coil and a bias capacitor form a series circuit, the capacitor's free end being connected to one of the ends of a voltage source, while the coil's free end can be switched to one end of the voltage source during the pre- and post-sampling intervals, and to the other end during the sampling interval. Only one voltage source and two switches are thus needed. Such a coil drive is simple, especially if the supply voltage is the voltage source: if realized in CMOS technology, the switch connected to the positive supply can be a p-channel transistor and the switch connected to the negative supply an n-channel transistor.

Advantageously if a circuit according to the invention is realized in a CMOS technology, the positive supply voltage applied through the p-channel transistor is applied during the pre- and post-sampling interval of the pulse and the negative supply voltage through the n-channel transistor during the sampling interval, with the pre- and post-sampling intervals being much shorter than the sampling interval. This minimizes losses, as the n-channel transistor's current carrying capacity and output conductance are substantially higher than the p-channel transistor's: the higher losses occur during the shorter time and the total pulse duration is not much longer than the required sampling time, i.e. the required sampling interval.

A coil drive circuit according to the invention and destined for a transducer having several identical drive coils are connected to a common capacitor. The coils' other end is either left open or selected for the duration of at least one entire pulse to form a series circuit with the common capacitor. To get identical pulse timing for each coil, a common timing generator is connected to each coil's switches through enabling logic, so that during any one pulse, the desired coil or coils may be energized. Enabling logic may also select the transducer's coil or coils to be sampled during any one pulse. Such a coil drive circuit, in addition to reducing the number of circuit components, ensures identical operation of all the transducer's coils, which benefits accuracy.

A coil drive circuit according to the invention may have a variable pulse length and/or pulse rate, e.g. a shorter pulse length and a lower pulse rate in an idle or "watchdog" reduced power mode monitoring motion to avoid loosing track of displacement: as soon as some motion is detected, normal operation resumes.

Finally, in a circuit according to the invention the drive and pickup coil may be one and the same, i.e. a change in total inductance rather than in mutual inductance is measured. For more accurate sampling in this case, the voltage across the coil should be sampled.

DETAILED DESCRIPTION OF THE INVENTION

Figure 1:
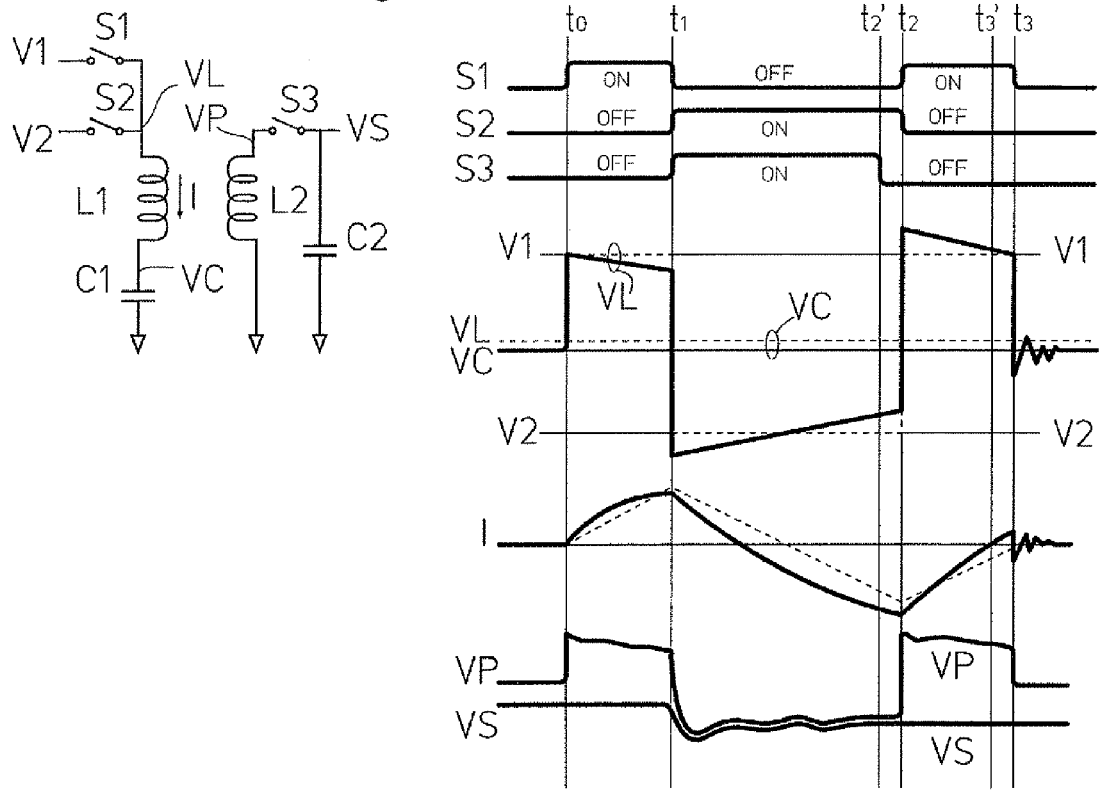
FIG. 1 shows a circuit diagram and waveforms of the basic transducer coil drive and sampling circuit according to the invention.

The circuit shown in FIG. 1 comprises a series circuit consisting of a transducer drive coil L1 and a storage capacitor C1. The series circuit may be left open, or connected either to a voltage $V_1$ through a switch S1 or a voltage $V_2$ through a switch S2. The voltage across coil L1 and capacitor C1 in series is VL, and the voltage across capacitor C1 alone is VC.

The voltage VP induced on a transducer sense coil L2 is stored as a sampled voltage VS on a sampling capacitor C2 through a sampling switch S3. The circuits operation is shown by the waveforms in FIG. 1, from the top down: the off (bottom) or on (top) states of switches S1, S2, S3, voltages VL and VC sharing a same voltage scale, the coil current I, and induced voltage VP and sampled voltage VS sharing a same voltage scale. Dotted lines show waveforms of a loss-free circuit, referred to hereafter as the ideal circuit, continuous lines show waveforms of a circuit with resistive components, i.e. with coil L1 and switches S1 and S2 having a finite conductance, referred to hereafter as the real circuit. Timing marks: the pulse lasts from time t0 to t3; time t0 is the begin of the pre-sampling interval, t1 is its end and the begin of the sampling interval, t2 is its end and the beginning of the post-sampling interval, t3 is its end; sampling stops at time t2' just before t2.

For the sake of clarity, ideal circuit operation is described here first, referring to the voltage and current waveforms in dotted lines in FIG. 1. Before a pulse starts, i.e. before time to, both switches S1 and S2 are off (open): no current flows through coil L1 and capacitor C1, so that any charge left on capacitor C1 and its voltage $V_C$ remain constant. Voltage $V_L$ is equal to $V_C$ as there is no current through coil L1, thus no voltage across it. The pulse starts with the pre-sampling interval at time t0: switch S1 is turned on (closes), and voltage $V_L$ jumps to $V_1$. A current I starts to flow through inductor L1 and capacitor C. Its rate of change is proportional to the voltage (V1-VC) across coil L1. The pre-sampling interval stops at time t1 when switch S1 opens and the sampling interval starts: switch S2 closes, and voltage VL jumps to V2. The rate of change of current I is now proportional to the voltage (V2-VC) across the coil, and, assuming that voltage VC is between voltages V1 and V2, the current waveform's slope reverses. In FIG. 1, voltage V1 is higher than VC and V2 lower, so that current I increases between time t0 and t1, then decreases until the end of the sampling interval at time t2 when switch S2 opens and the post-sampling interval starts: switch S1 closes again, so that VL jumps again to V1, and the rate of change of current I is the same again as in the pre-sampling interval. The post-sampling interval and the pulse end at time t3 when switch S1 opens. Both switches S1 and S2 being open, the voltage VC across the capacitor is held until the next pulse.

Current I builds up a net charge in capacitor C1 and drives voltage VC to its steady-state value, i.e. for which the net charge added during a pulse becomes zero. Obviously, this steady-state value of voltage VC has to be between voltages V1 and V2, as otherwise the current, starting from zero, would either only charge capacitor C1 during a pulse (if VC is below V1 and V2) or only discharge it (if VC is above V1 and V2): so, voltage VC automatically settles to some value between voltages V1 and V2.

Once a steady state is attained, all voltage and current waveforms are as shown in FIG. 1. In the ideal loss-free case, capacitor voltage VC is exactly the same before and after the pulse, and current I is zero when the pulse begins at time to and when it ends at time t3. From an energy point of view, ideal operation is as follows. During the pre-sampling interval, from t0 to t1, the increasing coil current builds up magnetic energy. This stored energy is then fed back as electric energy into the circuit during the first half of the sampling interval, starting at time t1, until no magnetic energy is left when the decreasing coil current crosses zero. During the other half of the sampling interval, ending at time t2, magnetic energy builds up again in coil L1 as the coil current I increases in the opposite direction. During the post-sampling interval, from t2 to t3, electric energy is fed back from the coil into the circuit until the opposite current decreases to zero at time t3. If the current I is not zero at time t3, its associated magnetic energy is dissipated after the pulse.

Thus, another desirable feature for low-power operation is to have no coil current left at the end of the pulse. The condition for this to be the case in an ideal, i.e. lossless, circuit's steady-state operation is that the pre- and post-sampling intervals be equal: current I will thus rise linearly from time to a peak value at time t1, then decrease linearly to a negative peak value at time t2, and rise again linearly and with the same slope as between time t0 and t1 until it stops at zero at time t3. With equal pre- and post-sampling intervals (t1-t0=t3-t2), it logically follows that both current peaks are opposed and equal for the ideal case (dotted lines) shown in FIG. 1, so that a positive current I charges capacitor C1 until the middle of the pulse, when current I crosses zero and becomes negative, discharging capacitor C1 until the end of the pulse by the same amount: the net charge and the current at the end of the pulse are then effectively both zero, for an ideal circuit.

Sampling switch S3 is normally open. At the start of a sampling interval at time t1, sampling switch S3 closes, and the voltage picked up by sense coil L2 is transferred to sampling capacitor C2. The sampling switch S3 gets closed at time t2', just before time t2 at the end of the sampling interval, to avoid picking up transients due to the voltage change on coil L1 at time t2. From then on, capacitor C2 holds the charge until the next pulse. Sampling as described needs almost no power, and the sample-and-held signal can be followed by low-frequency analog signal-processing circuitry using little power. Sampling itself has to be sufficiently long for transients to settle. These transients are created by the voltage change across coil L1 at the begin of the sampling interval. Their decay time is primarily a function of the transducer coils' distributed parameters.

Losses from switch and coil resistance are low if the drive circuits L/R time constants exceed the pulse width. Operation is then close enough to the ideal case for a power comparison with other pulsed drive methods. For a valid comparison, they should all have the same sampling time and the same induced voltage VP for an identical transducer coil configuration, which is the case if they have the same drive coil voltage during sampling. For easier comparison, the circuit's pre- and post-sampling intervals are each half as long as the sampling interval, as shown in FIG. 1. The steady-state capacitor voltage VC and also the coil voltage during sampling, is then equal to the average of voltages V1 and V2.

The first comparison is made with a simple, commonly used square pulse, driven from half of the supply voltage (e.g. from a capacitive voltage divider) and applied to the coil for the same sampling interval: as its current goes from zero to the peak current, instead of from the negative peak current to the positive one, it has twice the peak coil current at the end of the pulse, thus four times the magnetic energy, which is not recovered. As a result, its power consumption is way above that of a circuit according to the invention.

An additional simple square pulse with the opposite voltage across the coil (i.e. minus half the supply voltage) could immediately follow this simple square pulse: the current through the coil which rose from zero to a peak value would then go back to zero as in the abovementioned hypothetical discontinuous mode buck converter with a current-recovering charge pump instead of a load. No magnetic energy would be lost either, as the current at the end of the pulse is also zero, but resistive losses are about four times that of a circuit according to the invention, as current goes from zero to a peak value and back, instead of going from zero to half this peak value and back twice within the same time. Here again, the power consumption would be quite more than that of a circuit according to the invention.

A real circuits losses change the coil's voltage and current waveforms, so that pre- and post-sampling intervals optimized for minimal power consumption are not equal anymore. To analyze these changes, the real circuit's operation is described here, referring to the voltage and current waveforms in continuous lines in FIG. 1. These changes being overwhelmingly due to the resistance of switches S1 and S2 and the effective resistance of coil L1 (including eddy current losses), only their influence will be taken in account here. Capacitor C1 is essentially loss-free and also large enough for ripple voltage across it to be neglected. As the circuit's operation remains essentially the same, the coil's resistance is conveniently removed from the coil and added instead to each switch resistance: as only one switch is active at a time, the result will be the same.

During the pre-sampling interval, from to t1, the voltage VL waveform, starting at voltage V1, is tilted downwards as the resistive voltage (V-VL) across switch S1 increases with increasing current I. At time t1 the sampling interval starts and coil L1 is switched to V2, voltage VL drops under V2, because of the resistive voltage across switch S2 due to the same peak current. The waveform of voltage VL is now tilted upwards and crosses voltage V2 near the middle of the sampling interval, when current I becomes zero and reverses to reach its negative peak at time t2. The post-sampling interval starts and coil L1 gets switched back to voltage V1. Because of the negative peak current, voltage VL is above V2 and drops thereafter, as current I ramps up again to zero.

If this real circuit's voltage VL waveform, drawn as a continuous line in FIG. 1, is compared to the ideal circuit's waveform, drawn as a dotted line, it is apparent that the average voltage VL is the same in the ideal and real circuit, i.e. equal to the average of voltages V1 and V2. If the real circuit's voltage VC were the same than the ideal circuits voltage, it would follow that the average voltage (VL-VC) across the coil would remain zero. As the integral of the coil voltage over time, divided by inductance, yields current I, this current would thus be zero at the end of the pulse. However, the resistive voltage drop, i.e. the difference between the real and ideal voltage VL, being negative until the middle of the pulse, and positive thereafter, would cause the real current waveform's slope to be inferior to the ideal slope until mid-pulse and superior from then on: the average current and the net charge would be negative. The real circuit's voltage VC has thus to be lower than the ideal one to preserve charge balance. This being the case, the integral of the real circuit's coil voltage (VL-VC) during a pulse is now positive instead of zero, so that the current will be positive at the end of the pulse at time t3, after having crossed zero at time t3', as shown in FIG. 1. This leftover current's magnetic energy is thus added to the other losses.

The magnetic energy left is normally smaller than the resistive losses, but it creates a transient voltage at switch-off which might cause additional losses, e.g. by triggering parasitic bipolar transistors in a CMOS circuit. This solution is best for transducers having always the same components This makes it desirable to stop the pulse when the coil current crosses zero. One way to do this is to make the post-sampling interval somewhat shorter than the pre-sampling interval by a known amount, so as to have negligible current through the series circuit at the end of the pulse. This works well for circuits with same components, including coils, so that the coil currents zero-crossing time is well defined.

As an alternative, may be used as a switch during the post-sampling interval. the diode turns on when the sampling interval ends and turns off when the current through the series circuit falls to zero, thereby ending the post-sampling interval: no magnetic energy is left at the end of the pulse, but at the cost of losses due to the diode's forward voltage.

Figure 2:
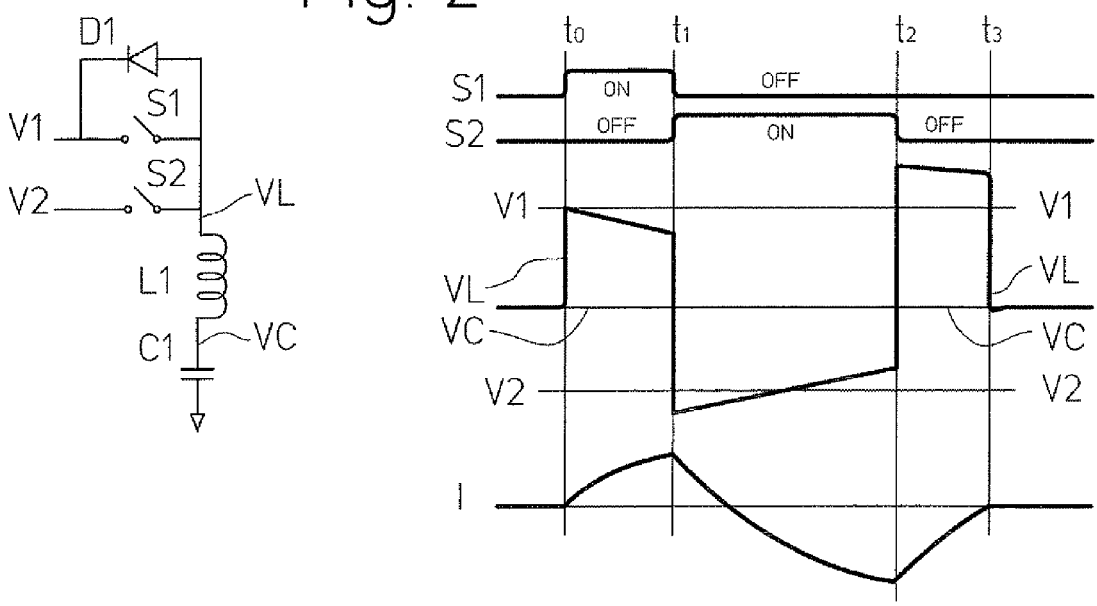
FIG. 2 schematically shows a circuit diagram and waveforms of a variant of the coil drive circuit according to the invention including a diode.

Another way to stop the pulse when the coil current attains zero is by using a freewheeling diode shunting the switch applying the first voltage to the series circuit and which turns on when the voltage across the series circuit has the same polarity and is higher than the first voltage. The coil drive circuit of FIG. 1 with a diode added is shown in FIG. 2. All components are identical and the circuit is the same, except for a diode D11, added here shunting switch S1. The same voltages and currents in FIG. 1 and FIG. 2 are measured across the same components. Voltage V1 being assumed higher than V2, diode D1 is polarized to conduct if voltage VL rises above voltage V1. The circuit's operation is shown by the waveforms in FIG. 2, starting from the top: the on (bottom) or off (top) states of switches S1, S2 and diode D, the voltages VL and VC sharing a same voltage scale, and the current I. The timing marks are the same for both figures, but in FIG. 2 the pulse and the post-sampling interval stop at t3' instead of t3. The waveforms shown approximate those from a real circuit, assuming that voltage VC attained its steady-state value The diode circuit waveforms shown in FIG. 2 are the same as in FIG. 1 until time t2, when switch S2 is opened, interrupting the coil circuit, as switch S1 stays open here: the coil's energy drives voltage VL instantaneously from a low voltage near voltage V2 to a voltage one diode drop above V1, so diode D1 starts conducting. Current I decreases with the coil's energy, and when it reaches zero, voltage VL collapses and diode D1 stops conducting. During the post-sampling interval diode D1 thus takes over the function of switch S11, with the only difference that it automatically switches off when the coil current hits zero, so that no energy is left in the coil. Such a circuit is of interest when the coil's zero-crossing time may not be anticipated, e.g. in a proximity sensor where the coil's equivalent resistance increases as the conducting target gets closer.

Other advantages of diode circuits as shown in FIG. 2 include: simpler switch control needing less energy, each switch only requiring one square pulse; and diode D1 acting as a voltage clamp protecting the circuit. There are also disadvantages: additional loss due to the diode's forward voltage drop; high diode capacitance before reaching its conducting voltage. A possible compromise could be a circuit where switch S1 would still close during the post-sampling interval to share current with diode D1, then open again before the coil currents expected zero crossing. The choice of circuit depends on the application.

A specific embodiment of a coil drive circuit according to the invention, equivalent to the circuits above wherein Voltages V1 and V2 are equal and opposed, can be realized with only one voltage source, e.g. a battery of voltage V1, connected one way during the pre-sampling and post-sampling intervals, and the other way during the sampling interval. Only one voltage source is needed, but four switches are required to reverse it.

A simpler embodiment of a coil drive circuit according to the invention consists in that the coil and a bias capacitor form a series circuit, the capacitor's free end being connected to one of the ends of a voltage source, while the coil's free end can be switched to one end of the voltage source during the pre- and post-sampling intervals, and to the other end during the sampling interval. This embodiment is equivalent to the circuits described above in FIG. 1 and FIG. 2, only that one of the two voltages V1 or V2 is zero. Just one voltage source and two switches are thus needed. Such a coil drive is simple, especially if the supply voltage is the voltage source: if realized in CMOS technology, the switch connected to the positive supply is a p-channel transistor, and the switch connected to the negative supply is an n-channel transistor, the gate voltages controlling the "on" or "off" state of these transistors being either at the positive or negative supply: the n-channel transistor is off when its gate is at the negative supply and on when at the positive supply, and the p-channel transistor is off when its gate is at the positive supply and on when at the negative supply. Only one supply is needed for the whole circuit.

Figure 3:
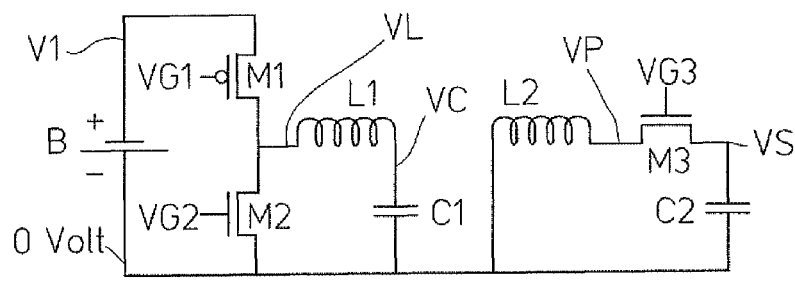
FIG. 3 shows schematically and by way of example a CMOS implementation of a coil drive and sampling circuit according to the invention and its waveforms.
Figure 3:
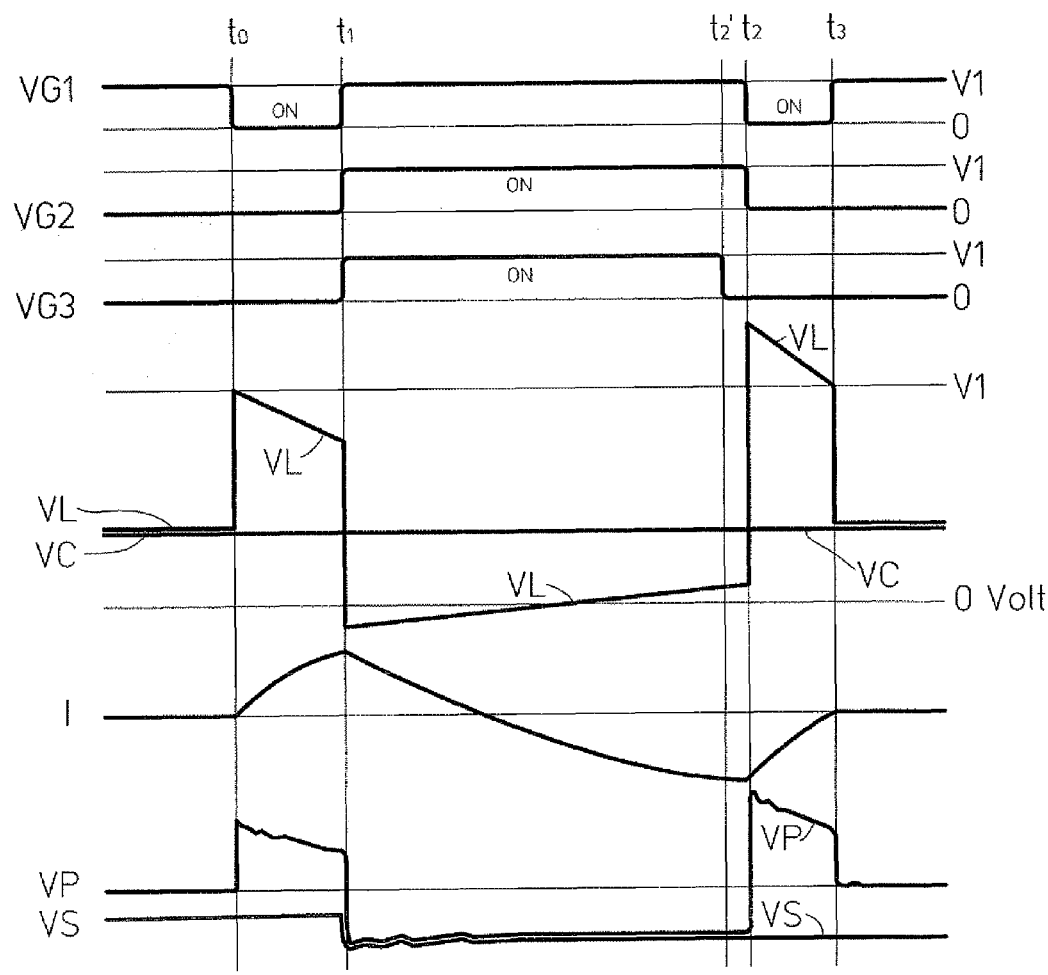

A CMOS implementation of a coil drive and sampling circuit according to the invention is shown in FIG. 3 with its waveforms. The positive side of voltage source B delivers a voltage V1 to the circuit, its negative side connected to a common voltage (zero Volt). A p-channel transistor M1 and an n-channel transistor M2 form a half-bridge, as the channel of p-channel transistor M1 is connected to voltage V1 at the positive end of voltage source B and the channel of n-channel transistor M2 is connected to the common voltage (zero Volt) at the negative end of voltage source B. The channels of transistors M1 and M2 are connected together and also to drive coil L1 in series with capacitor C1 and the common voltage (zero Volt). As above, voltage VL is the voltage across L1 and C1 and VC is the voltage across C1 only. The channel of an n-channel transistor M3 links a pick-up coil L2 to a sampling capacitor C2, the other end of capacitor C2 and coil L2 being connected to the common voltage. As above, voltage VP is induced on pick-up coil L2 and voltage VS is across sampling capacitor C2. The gates of transistors M1, M2, M3 are connected respectively to control voltages VG1, VG2, VG3.

The CMOS circuits operation is shown by the waveforms in FIG. 3. The following waveforms are shown from the top down: control voltages VG1, VG2, VG3, voltages VL and VC (on a common voltage scale), coil current I, and voltages VP and VS (on a common scale). Waveform timing marks are the same as shown in FIG. 1: time t0 is the start of the pulse and thus also of the pre-sampling interval ending at time t1, starting the sampling interval, time t2 ending it and starting the post-sampling interval, time t3 ending it as well as the pulse; time t2' is the end of the sampling pulse. The waveforms in FIG. 3 approximate those of a real circuit.

Operation is as follows: before the pulse, transistors M1, M2 and M3 are off, control voltage VG1 being high (at voltage V1) and control voltages VG2 and VG3 being low (at zero Volt). It is assumed that capacitor C1 is large enough for voltage ripple on it to be neglected and also that voltage VC has already reached its steady-state value. At time t0, control voltage VG1 falls and turns transistor M1 on, so voltage VL equals V1. Current I in the coil ramps up from zero and decreases voltage VL, as the resistive voltage drop due to current I across transistor M1 increases. At time t1, control voltages VG1 and VG2 rise, turning transistor M1 off and transistor M2 on, and voltage VL falls below zero Volt: as current I stays the same during the transition, there is an initial resistive negative voltage drop across transistor M2. Between times t1 and t2, coil voltage VL goes from under zero Volt to above, because of the current ramping down (as voltage VL-VC decreases) and changing its direction, thus reversing the resistive voltage drop across transistor M2. Sampling takes place between time t1 and t2', as control voltage VG3 goes high from time t1 to t2'. The voltage VP induced on pick-up coil L2 charges holding capacitor C2 from time t1 until time t2', which is just ahead of time t2 to avoid sampling transients. After time t2' transistor M3 is off and the sampled voltage VS on capacitor C2 is held (until the next pulse). At time t2 control voltages V1 and VG2 fall again, switching transistor M2 off and transistor M1 on again. Voltage VL rises above V1 because of the resistive voltage drop across transistor T1 due to current I. Voltage VL then decreases to voltage V1 at the end of the pulse as the current I crosses zero near time t3, the timing being adjusted for this: the post-sampling interval is shorter than the pre-sampling interval.

For an optimal circuit design, attention has to be paid to the fact that a p-channel transistor is about three times less conductive than an equally sized n-channel transistor (hence the higher resistive voltage drop across transistor M1 as shown in the voltage VL waveforms in FIG. 3). Making p-channel transistors much larger is not optimal, as it increases gate capacitance, hence gate drive loss, and slows down transitions.

A better way is to select a p-channel switching transistor for the pre-sampling and post-sampling intervals and an n-channel switching transistor for the sampling interval, and shorten the pre-sampling and post-sampling intervals, as shown in FIG. 3. This reduces the resistive loss of the p-channel switching transistor, but also reduces voltage VC stored on capacitor C, which in turn reduces the picked-up voltage VP, making the transducer less sensitive. A reasonable compromise is a sampling interval three to four times longer than each of the other two intervals. Another advantage of using an n-channel switching transistor during the sampling interval is that less signal amplitude is lost due to channel resistance by the time sampling ends. This partly compensates the lowered picked-up voltage and also reduces the influence of resistive voltage drops on the picked-up signal.

Figure 4:
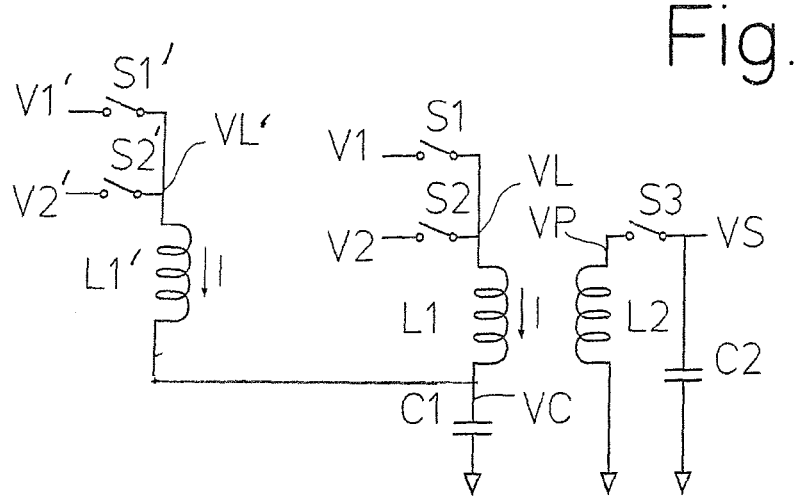
FIG. 4 schematically shows a circuit diagram of an alternative embodiment of a transducer coil drive and sampling circuit according to the invention.

As shown in the embodiment of FIG. 4, some transducers have two or more drive coils. If a circuit according to the invention is used to drive each coil, and all drive coils have to be driven with the same pulse waveform, only one common storage capacitor is needed, connected to all drive coils. The drive coils' other terminal may be selected for the duration of at least one pulse to form a series circuit with the common capacitor. Each coil's driving transistors would be controlled by a common timing signal circuit through control signal enabling gates. This would minimize variations between coils as well as the resulting loss of accuracy, and save components and connections.

A coil drive circuit according to the invention may have a variable pulse length and pulse rate. Such a feature is especially useful in so-called incremental position transducers, whose output is a periodic function of their position. If such a transducer is switched off, it will not sense any movement and thus might miss a few periods and indicate an erroneous position after switch-on. To avoid this, the transducer may be switched into an idle or "watchdog" mode when there is no movement and no position display is needed. Sampling, and thus the pulse length, may then be shorter, as it is sufficient to have a coarse reading, just to avoid loosing track of displacement. Also, the pulse rate may be lowered to a rate still permitting the safe detection of initial motion (in which case normal operation would be resumed immediately). Power consumption in the idle mode is consequently much lower because of the lower pulse rate and of the shorter pulse duration It has been experimentally found that for a hand measuring tool such as caliper, the pulse rate in this idle mode may be reduced from the normal operating rate by a factor of four, and the pulse length by a factor up to two.

Finally, in a circuit according to the invention the drive and pickup coil may be one and the same, i.e. a change in self-inductance rather than in mutual inductance is measured. For more accurate sampling in this case, the voltage across the coil should be sampled.

For this, both ends of the coil can be sampled at the same time and the sampled signals' voltage difference acquired, e.g. by a conventional differential amplifier. In addition, sampling the coil differentially at both ends also increases immunity to external interference, so that this differential sampling method may also be of advantage in the case where drive and pick-up coils are separate. In this case, it is also beneficial to improve the symmetry by not connecting one end of the pick-up coil to the common voltage, and instead connecting both ends to the common voltage through equal resistors.

I claim:

1. A pulsed coil drive for a sampled inductive transducer wherein at least one drive coil and a capacitor form a series circuit that is open during intervals between pulses, each pulse having three successive sampling intervals, a pre-sampling interval with a first voltage switched across the series circuit, a sampling interval with a second voltage switched across the series circuit long enough for adequate sampling, and a post-sampling interval with the first voltage switched across the series circuit.

2. The pulsed coil drive according to claim 1, wherein the post-sampling interval is shorter than the pre-sampling interval, so as to have negligible current through the series circuit at the end of the pulse.

3. The pulsed coil drive according to claim 1, including a switch through which the first voltage is applied to the series circuit and a diode shunting the switch and which turns on when the voltage across the series circuit has the same polarity and is higher than the first voltage.

4. The pulsed coil drive according to claim 1, wherein the capacitor has a free end connected to one terminal of a voltage source, the at least one drive coil has a free end, left open between pulses and switched to the other terminal of the voltage source or first voltage during the pre-sampling interval, is then switched to the one terminal of the voltage source during the sampling interval, the second voltage being thus zero, and then switched back to the other terminal of the voltage source or first voltage during the post-sampling interval, and left open at the end of the pulse.

5. The pulsed coil drive according to claim 4 wherein the capacitor's free end is connected to the negative terminal of a voltage source, the at least one drive coil's free end, left open between pulses, is switched to the positive terminal of the voltage source through a p-channel MOSFET during the pre-sampling and post-sampling intervals, and switched to the negative terminal of the voltage source through an n-channels MOSFET switch during the sampling interval, the pre-and post-sampling intervals together being shorter than the sampling interval.

6. The pulsed coil drive according to claim 1, wherein the sampled inductive transducer includes two or more coils, each coil having one of its terminals connected the capacitor, the other terminal being either left open or selected to form a series circuit with the capacitor for the duration of at least one entire pulse.

* * * * *